United States Patent [19]

Sugino et al.

[11] Patent Number: 4,661,037
[45] Date of Patent: Apr. 28, 1987

[54] ANGULAR AND POSITIONAL DEVIATION ADJUSTING MECHANISM OF A ROBOT HAND

[75] Inventors: Yoshihide Sugino, Chigasaki; Yoshinori Shiote, Kamakura; Kazuyoshi Yamaki, Chigasaki, all of Japan

[73] Assignee: Yamatake-Honeywell Co., Ltd., Tokyo, Japan

[21] Appl. No.: 812,960

[22] Filed: Dec. 24, 1985

Related U.S. Application Data

[63] Continuation of Ser. No. 513,041, Jul. 12, 1983, abandoned.

[30] Foreign Application Priority Data

Jul. 12, 1982 [JP] Japan ................................ 57-121082

[51] Int. Cl.⁴ .............................. G01B 3/22; B66C 3/00
[52] U.S. Cl. ........................................ 414/729; 901/45; 33/169 C; 33/559; 33/572
[58] Field of Search ........... 901/45; 33/169 C, 185 R; 414/729, 730; 403/166, 229, 80, 146, 147

[56] References Cited

U.S. PATENT DOCUMENTS 3,984,006 10/1976 Takeyasu et al. .................. 414/589
4,086,704  5/1978 Masaichi ........................... 33/169 C
4,179,783 12/1979 Inoyama et al. ................... 901/45 X
4,320,674  3/1982 Ito et al. ............................ 901/45 X
4,400,885  8/1983 Consales ............................ 901/45 X
4,439,926  4/1984 Whitney et al. .................. 901/45 X

OTHER PUBLICATIONS

Lane, "Evaluation of a Remote Center Compliance Device", *Assembly Automation*, Nov. 1980, pp. 36–45.

Primary Examiner—Joseph J. Rolla
Assistant Examiner—Jay I. Alexander
Attorney, Agent, or Firm—Blakely, Sokoloff, Taylor & Zafman

[57] ABSTRACT

There is provided an angular and positional deviation adjusting mechanism of a robot hand comprising a holder secured to an arm, an eccentricity accommodating member urged against the holder by a first spring, and an angular deviation accommodating member biased toward the eccentricity accommodating member by a second spring, a slide member being interposed between the first spring and eccentricity accommodating member to permit sliding of said eccentricity accommodating member, the contact sections of the angular deviation accommodating member and eccentricity accommodating member being formed such as to permit swinging of the angular deviation accommodating member, the biasing force of the first spring belt set to be lower than the biasing force of the second spring.

6 Claims, 11 Drawing Figures

ANGULAR AND POSITIONAL DEVIATION ADJUSTING MECHANISM OF A ROBOT HAND

This is a continuation of application Ser. No. 513,041, filed Jul. 12, 1983, now abandoned.

BACKGROUND OF THE INVENTION

This invention relates to an angular and positional Deviation Adjusting Mechanism of an industrial robot hand for performing various operations and, more particularly, to such a mechanism of a hand for inserting workpiece into a hole.

Recently, industrial robots have come to be used extensively in a variety of industrial fields along the development of information apparatus and in response to the demand for saving man-power. Industrial robots, particularly those which function to grip workpieces to set them in machine tools and remove them therefrom, or to transport them, are required to be able to handle the workpieces efficiently. In other words, it is required for the robot hand to have a high degree of freedom and be capable of providing the functions of a man's hand to a greater extent.

To analyze the operation of a robot of quietly placing an object having a flat bottom on a table at a predetermined position thereof, the arm of the robot is advanced until the bottom of the object comes in touch with the table, then the object is rotated about the contact point until its bottom is in close contact with the table, and then the object is moved along the table to the predetermined position. It is required of the apparatus for effecting such a motion to be highly sensitive to even a small external force for a rotation of the gripped object as well as to be sufficiently rigid for transmitting a large force so as to more the object along the table. The applicant has proposed earlier a linkage which can meet these contradicting requirements as disclosed in Japanese Patent Publication No. 56-45758.

This linkage has a pair of columns, first and second linking members and an operating arm. It can readily receive a rotational motion about a compliance center without causing any displacement of the center at all before or after an action is made, while it can provide high rigidity for a linear motion in the displacement of the center.

With the prior art robot hand having a linkage of the type described above, however, the operation of inserting a workpiece into a hole cannot always be performed efficiently because the workpiece readily rotates about the contact point when it is about to be inserted.

SUMMARY OF THE INVENTION

Accordingly, it is a principal object of this invention to provide an improved angular and positional deviation adjusting mechanism of a robot hand capable of reliably inserting a workpiece into a hole without the possibility of the workpiece falling down in the opposite direction as according to the prior art.

Another object of the invention is to provide an improved angular and positional deviation adjusting mechanism of a robot hand capable of efficiently handling workpieces.

To accomplish the objects, extensive studies and analyses of the operation of inserting a workpiece have been made by the inventors, and it has been found better to permit a straightforward movement of the workpiece while holding its attitude (i.e., its angle) after it is brought into contact with the hole and before its rotation is caused, rather than to permit its rotation as soon as it is brought into contact with the hole.

Therefore, according to one aspect of the present invention, there is provided an angular and positional deviation adjusting mechanism of a robot hand comprising a holder secured to an arm, an eccentricity accommodating member urged against said holder by a first spring, and an angular deviation accommodating member biased toward the eccentricity accommodating member by a second spring, a slide member being interposed between the first spring and eccentricity accommodating member to permit sliding of said eccentricity accommodating member, the contact sections of the angular deviation accommodating member and eccentricity accommodating member being formed such as to permit swinging of said angular deviation accommodating member, the biasing force of said first spring being set to be lower than the biasing force of said second spring.

DESCRIPTION OF THE PREFERRED EMBODIMENTS

Figure 1:
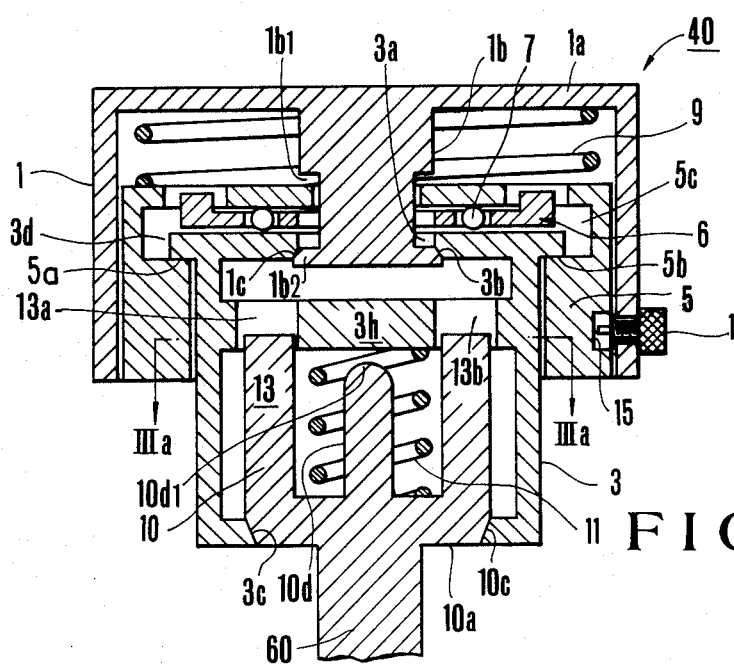
FIG. 1 is a cross-sectional view showing an essential part of the angular and positional deviation adjusting mechanism of a robot hand according to the invention.

FIG. 1 shows an embodiment of the angular and positional deviation adjusting mechanims of a robot hand according to the invention. With regard to the Figure, reference numeral 1 designates a holder secured to an arm, not shown. The holder 1 is cylindrical in shape and has a top 1a and a bottom opening, and it also has a coaxially columnar inner and downward projection 1b projecting from the lower surface of the top 1a. The inner projection 1b is longitudinally shorter than the holder and has a peripheral groove 1b1 of a reduced diameter compared with its stem portion. There is, therefore, formed a flange 1b2 at the lower end and the flange has a peripheral seat surface 1c with an inclination.

Reference numeral 3 designates an eccentricity accommodating member, which is substantially cylindrical in shape and has openings at the top and bottom. The eccentricity accommodating member 3 which is containerlike has through its top an opening 3a of a diameter larger than that of the peripheral groove 1b1 of the projection 1b and smaller than that of the flange 1b2 whereby the peripheral groove 1b1 is loosely fit in the opening 3a to be movable in the axial direction. The opening 3a has along its lower edge a peripheral seat surface 3b to be seated on the seat surface 1c. The eccentricity accommodating member 3 further has an opening 3c through the bottom and a seat surface 4 formed along the edge thereof to be seated by an angular deviation accommodating member described later.

Figure 2:
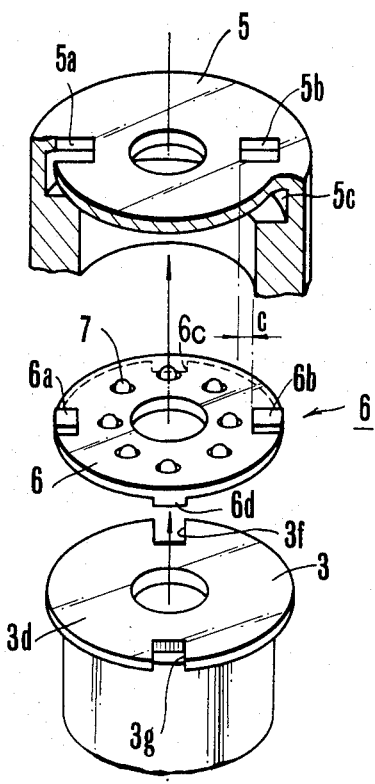
FIG. 2 is a perspective view showing a slide member.

Reference numeral 5 designates a regulating cylinder for regulating the eccentricity accommodating member 3 to be parallel to the holder 1. The top of the regulating cylinder 5 is provided with axially symmetrical rectangular openings 5a and 5b and the inner wall of the regulating cylinder 5 is provided with a peripheral groove 5c adjacent to the top. A top flange 3d of the eccentricity accommodating member 3 is in contact with the lower shoulder of the peripheral groove 5c. A slide member 6 is interposed between the regulating cylinder 5 and eccentricity accommodating member 3 to permit movement of the eccentricity accommodating member 3 in radial directions. As clearly shown in FIG. 2, the slide member 6 includes a disc 6 having uniformly spaced-apart-see-through holes at a radius of the axial center and balls 7. The top and bottom surfaces of the disc 6 have protuberances 6a-6b and 6c-6d formed in mutually perpendicular directions. The protuberances 6a and 6b are engaged with the openings 5a and 5b of the regulating cylinder 5 and the protuberances 6c and 6d are inserted into notches 3f and 3g of the eccentricity accommodating member 3 formed in positions corresponding to the respective protuberances 6c and 6d. The notches 3f and 3g and protuberances 6c and 6d have such shapes that the latter can snugly fit in the former. The notches 5a and 5b and protuberances 6a and 6b are shaped such that a gap c is defined so that the slide member 6 and eccentricity accommodating member 3 integrated can be moved transversally (i.e., in radial directions) relative to the regulating cylinder 5. That is, the eccentricity accommodating member 3 is restricted against rotation and is allowed to move only in radial directions.

Reference numeral 9 designates a first spring interposed between the holder 1 and regulating cylinder 5. The first spring 9 is a compression coil spring disposed in an elastically deformed state and urges the eccentricity accommodating member 3 so that the seat surface thereof is in contact with the seat surface 1c of the holder 1 at all time. The eccentricity accommodating member 3 is urged downward 1 by the biasing force of the first spring 9 via the top of the regulating cylinder 5 and the slide member 6 while the holder 1 is urged upward by the first spring 9, whereby the seat surface 1c of the holder 1 and the seat surface 3b of the eccentricity accommodating member 3 are kept constantly in touch with each other.

Figure 3A:
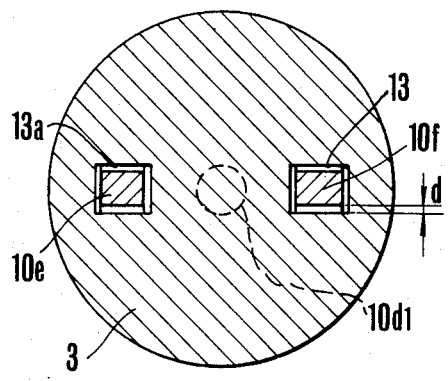
FIGS. 3a and 3b are respectively a plan view and a side section view of an angular deviation accommodating member.
Figure 3B:
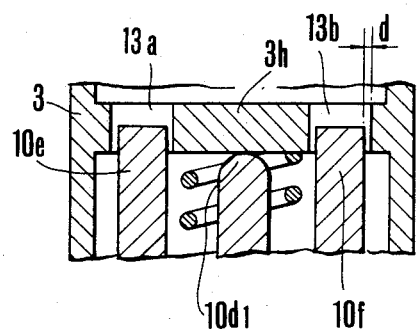

Reference numeral 10 designates a cylindrical angular deviation accommodating member, having an E-shaped cross section and contained in the eccentricity accommodating member 3. The angular deviation accommodating member 10 is coaxially urged against the eccentricity accommodating member 3 by the biasing force of a second spring 11 set to be stronger than that of the first spring 9. The angular deviation accommodating member 10 is cylindrical in shape having a bottom 10a. It has a seat surface 10c formed on its periphery adjacent to the bottom and in close contact with the seat surface 4c. A rod 60 of a hand, not shown, for gripping a workpiece is mounted on the outer surface of the bottom, to which are provided fingers. It also has an inner projection 10d, which is capable of being brought into contact with the eccentricity accommodating member 3. The inner projecton 10d has a spherical tip 10d1 so that the angular deviation accommodating member 10 can swing. As clearly shown in plan views in FIGS. 3a and FIG. 3b, a gap d is defined between each of see-through holes 13a and 13b formed through a horizontal partition 3h provided in the eccentricity accommodating member 3 and each of the protuberances 10e and 10f of the angular deviation accommodating member 10 that are fitted in the see-through holes 13a and 13b. The angular deviation accommodating member 10 is thus allowed to swing by the two members not contacting each other.

Reference numeral 14 designates a screw screwed through a lower part of the outer wall of the holder 1, the end portion thereof being received in an elongate groove 15 formed in the axial direction on the outer periphery of the regulating cylinder 5 to restrict the rotation of the regulating cylinder 5.

Figure 4:
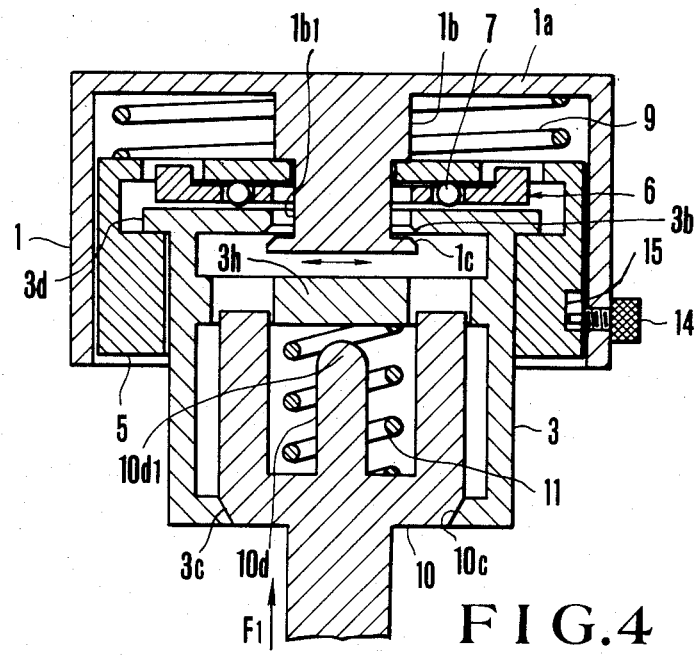
FIGS. 4 and 5 are cross-sectional views for explaining the operation of the essential part of the angular and positional deviation adjusting mechanism of a robot hand shown in FIG. 1.

With a robot hand 40 having the construction described above, when a comparatively weak reaction force $F_1$ from a workpiece not shown that can compress the first spring 9 acts on the angular deviation accommodating member 10, only the first spring 9 is compressed upward and deformed while the second spring 11 is urging the angular deviation accommodating member 10 down to firmly engage the seat surface 3c of the opening of the eccentricity accommodating member 3 with the seat surface 10c of the angular deviation accommodating member 10 as shown in FIG. 4. In other words, the seat surface 3b of the opening 3a at the top of the eccentricity accommodating member 3 is released from its state of being urged against the seat surface 1c of the holder 1, so that the angular deviation accommodating member 3 is released from the holder 1 and it is now slidable along the slide member 6. Thus, a state, in which only the accommodation of an eccentricity of the workpiece (i.e., a parallel displacement thereof) can be allowed without allowing an angular deviation of the workpiece (i.e., a rotation thereof), can be obtained.

Figure 5:
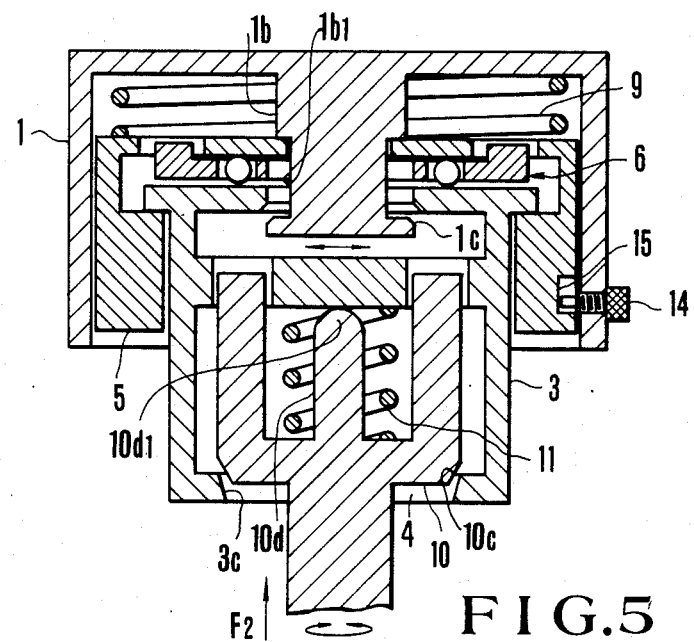

When additional force is applied from the workpiece for the top of the regulating cylinder 5 to reach the upper end of the groove 1b1 of the holder 1 and a reaction force $F_2$ that can compress the second spring 11 is further given, the spherical tip 10d1 of the inner protection 10d of the angular deviation accommodating member 10 is brought into contact with the partition 3h in the eccentricity accommodating member 3 and the regulating cylinder 5 contacts the upper shoulder of the groove 1b1 of the inner projection 1b of the holder 1 as shown in FIG. 5. Thus, the angular deviation accommodating member 10 can swing while the eccentricity accommodating member 3 can slide.

Figures 6A, 6B, 6C:
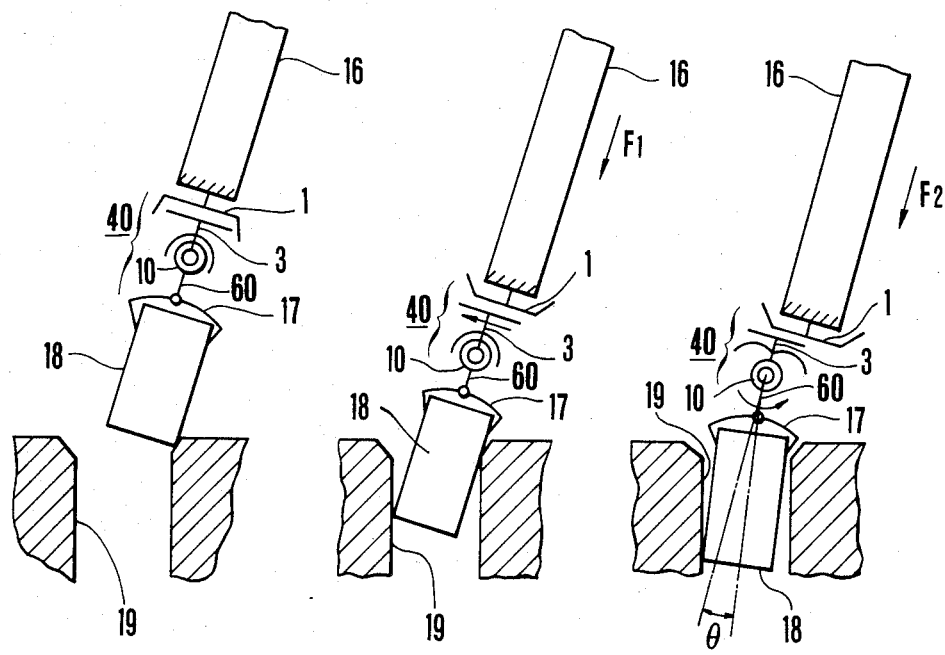
FIGS. 6a to 6c are schematic views for explaining the operation of inserting a workpiece.

The operational principles underlying the invention will now be described with reference to FIG. 6. FIGS. 6a, 6b and 6c schematically illustrate the operation of inserting a workpiece. Parts having functions equivalent to those shown in FIG. 1 are designated by like reference numerals. When a workpiece 18 gripped by fingers 17 provided to an arm 16 is brought into contact with the edge of the opening of a hole 19 as shown in FIG. 6a, this is detected, and the arm 16 is pushed into the hole by a pushing force $F_1$ as shown in FIG. 6b. At this time, the first spring (9 in FIG. 1) is compressedly deformed, whereby the eccentricity accommodating member 3 having been urged against the holder 1 is allowed to slide. Thus, an angular deviation (i.e., a rotation) of the workpiece is not allowed, but only its radial deviation.(i.e., its parallel movement) is allowed. The insertion of the workpiece proceeds in this state, and as the push-in of the arm 16 by the pushing force $F_1$ reaches a limit, this is detected, and the arm 16 is then pushed in by a pushing force $F_2$ greater than the pushing force $F_1$. At this time, the second spring (11 in FIG. 1) is compressedly deformed by the reaction force to the pushing force $F_2$. Consequently, the workpiece 18 is allowed to radially deviate (i.e., to make a parallel movement) while tne angular deviation accommodating member 10 is allowed to swing. An angular deviation (i.e., a rotation) is thus permitted so that a rotation by a predetermined angle $\theta$ is effected to complete the insertion. It is to be understood that, unlike according to the prior art the workpiece 18 is not allowed to rotate as soon as it is brought into contact with the hole 19, but it is allowed to rotate only after it is inserted to a certain extent.

Figure 7:
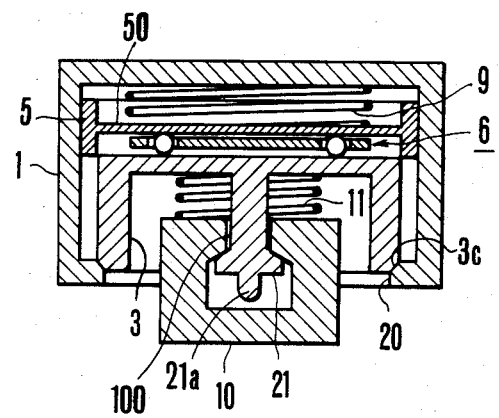
FIG. 7 is a sectional view showing a different embodiment.

FIG. 7 is a cross-sectional view of a different embodiment. In the Figure the parts that are the same as or equivalent to those in FIG. 1 are designated by like reference numerals and their explanations are omitted. In this embodiment, the bottom end 3c of the eccentricity accommodating member 3 is urged against an edge 20 of the opening through the bottom of the container-like cylindrical holder 1, while the angular deviation accommodating member 10 is urged against a supporting member 21 projecting from the eccentricity accommodating member 3. The supporting member 21 has a spherical tip to allow the swinging of the angular deviation accommodating member 10. The eccentricity accommodating member 3 is cylindrical with a reclining-E-Shaped cross section and the angular deviation accommodating member 10 has an opening 100 of such a size at its top that the supportng member, of the central projection projecting from the eccentricity accommodating member 3, having a flange does not escape but is loosely fit in. There is interposed the second spring 11 between the angular deviation accommodating member 10 and eccentricity accommodating member 3. The regulating cylinder 5 has an H-shaped cross section, and the first spring 9 is interposed between a central, horizontal partition 50 and top of the holder 1. When the comparatively weak force $F_1$ is applied from under to the angular deviation accommodating member 10, the first spring 9 is compressed for the bottom end 3c of the eccentricty accommodating member 3 to be released from the edge 20 of the bottom opening of the holder 1, which permits a radial deviation of the eccentricity accommodating member 3 along the slide member 6, and when the stronger force $F_2$ is further applied, the second spring 11 is compressed for the supporting member 21 to be released from the opening 100 of the angular deviation accommodating member 10. As the spherical tip 21a of the supporting member 21 contacts the bottom of the angular deviation accommodating member 10, the holder 1 rotates about the contact contact point.

Figure 8:
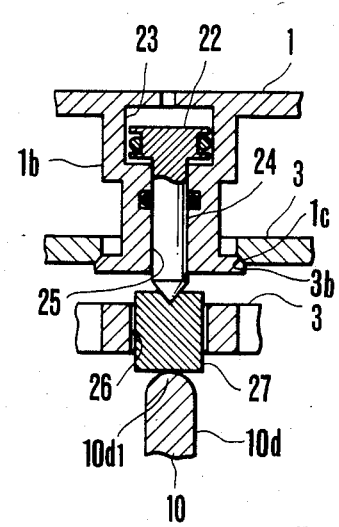
FIG. 8 is a cross-sectional view showing an essential part of the angular and positional deviation adjusting mechanism of a robot hand having an air cylinder.

FIG. 8 is a cross-sectional view showing the essential part of what is obtained by providing an hydraulic cylinder to the embodiment shown in FIG. 1. The inner projection 1b of the holder 1 has a cylinder 23, through which a piston 22 can be moved. A rod 24 coaxially projecting from the piston 22 penetrates a see-through hole 25 open into the holder 1, and it is in contact with a support member 27, which penetrates a see-though hole 26 formed in the eccentricity accommodating member 3 and is in turn in contact with an inner projection 12 of the angular deviation member 10.

Thus, it is possible by supplying fluid, such as air, having a predetermined pressure into the cylinder 23 to selectively press the angular deviation accommodating member 10 and consequently to secure the angular deviation accommodating member 10 to the holder 1 via the eccentricity accommodating member 3. A swinging of the angular deviation accommodating member 10 can, therefore, be prevented even when an unnecessary force is applied or when a heavy workpiece is manipulated.

While the above embodiment has used a slide member with balls, this is by no means limitative, and it is possible to use any member as long as it functions the same way with small surface friction For example, a commercially available sheet-like plain bearing can be used.

As has been described in the foregoing, according to the invention the eccentricity accommodating member which is capable of making a parallel movement is urged against the holder by the first spring while the angular deviation accommodating member capable of swinging is urged against the eccentricity accommodating member by the second spring providing a stronger biasing force than the first spring. Thus, when inserting a workpiece into a hole, the workpiece can make a parallel movement before it is rotated. The workpiece can, therefore, be reliably inserted without the possibility of falling in the opposite direction as according to the prior art. The angular and positional deviation adjusting mechanism of a robot hand according to the ivention can, thus, accurately insert a workpiece into a hole and transmit a torque to the workpiece while having compliance with the wrist.

Further, on account of the hydraulic cylinder provided which can selectively fix the angular deviation accommodating member to the holder, even a heavy workpiece can be reliably inserted into a hole without any operational error.

Thus, it is possible to permit efficient handling of workpieces, hence to permit a continuously stable operation with an improvement in productivity.

What is claimed is:

1. An angular and positional deviation adjusting mechanism of a robot hand comprising:
    a holder;
    an eccentricity accommodating member, said eccentricity accommodating member being capable of eccentric deviate movement with respect to said holder;
    an angular deviation accommodating member, said angular deviation accommodating member being capable of angular deviate movement with respect to said holder;
    a first inclined seating surface provided on said holder, a second inclined seating surface provided on a top end of eccentricity accommodating member a third inclined seating surface provided on a bottom end of said eccentricity accommodating member, and a fourth inclined seating surface provided on said angular deviation accommodating member;
    first urging means for urging said first inclined seating surface and said second inclined seating surface into engagement for the alignment of said eccentricity accommodating member with said holder, said first urging means being compressible to relieve the engagement so that an eccentric deviate movement of said eccentricity accommodating member with respect to said holder can be accommodated;

second urging means for urging said third inclined seating surface and said fourth inclined seating surface into engagement for the alignment of said eccentricity accommodating member with said angular deviation accommodating member, said second urging means being compressible to relieve the engagement so that an angular deviate movement of said angular deviation accommodating member with respect to said eccentricity accommodating member can be accommodated, wherein the urging force of said second urging means is greater than the urging force of said first urging means such that angular deviation is accommodated after eccentric deviation is accommodated.

2. An angular and positional deviation adjusting mechanism of a robot hand according to claim 1, wherein said holder has an E-shaped cross section with a lower opening and a central projection is provided with a regulating member for regulating the upward movement of said eccentricity accommodating member, and said eecentricity accommodating member is provided with a regulating member for regulating the downward movement of said angular deviation accommodating member.

3. An angular and positional deviation adjusting mechanism of a robot hand according to claim 2, wherein a regulating member for regulating the rotation of said eccentricity accommodating member is provided.

4. An angular and positional deviation adjusting mechanism of a robot hand according to claim 1, wherein said holder is cylindrical with an E-shaped cross section and said central projection is shorter than the side wall and has a peripheral groove near the tip thereof, and has said first inclined seating surface on an end flange thereof; said first urging member is interposed between the top of said holder and a regulating cylinder; the top of said regulating cylinder is loosely fit in said peripheral groove of said central projection and is regulated in upward movement, said regulating cylinder having a top opening which said central projection loosely penetrates; said eccentricity accommodating member is containerlike and has a top opening the diameter of which is such that said first inclined seating surface on the end flange of said projection can be engaged by said second inclined seating surface; a lateral partition is provided inside said eccentricity accommodating member; and the edge of an opening through the bottom of said eccentricity accommodating member has said third inclined seating surface thereon and is engageable with the lower surface of said angular deviation accommodating member which has said fourth inclined seating surface thereon; and said angular deviation accommodating member has an E-shaped cross section, the central projection thereof being shorter than the side wall thereof, and is biased from said lateral partition by said second urging member.

5. An angular and positional deviation adjusting mechanism of a robot hand according to claim 2, wherein part of said holder and part of said eccentricity accommodating member are engaged to each other in such a relationship that normally said holder and eccentricity accommodating member are urged toward one another.

6. An angular and positional deviation adjusting mechanism of a robot hand defined by claim 1, wherein said holder is provided with an hydraulic cylinder penetrating said eccentricity accommodating member for selectively urging said angular deviation accommodating member and said eccentricity accommodating member.

* * * * *